United States Patent [19]
Billheimer et al.

[11] Patent Number: 5,931,933
[45] Date of Patent: Aug. 3, 1999

[54] APPARATUS AND METHOD FOR COMMUNICATION AND TRANSLATION FOR SELECTED ONE OF A VARIETY OF DATA BUS FORMATS

[75] Inventors: Eric Allan Billheimer; Robert Wayne Schuster, both of Charlotte, N.C.; John Elliott Walker, York, S.C.

[73] Assignee: International Business Machines Corporation, Armonk, N.Y.

[21] Appl. No.: 08/877,014

[22] Filed: Jun. 16, 1997

[51] Int. Cl.⁶ .................................................. G06F 13/40
[52] U.S. Cl. ............................................... 710/129; 710/62
[58] Field of Search ...................... 395/309, 308, 395/306, 311, 312, 282, 280, 281, 285, 882, 883, 884, 892, 847, 831; 710/27, 61, 62, 63, 64, 11, 72, 100, 101, 105, 126, 128, 129, 131, 107

[56] References Cited

U.S. PATENT DOCUMENTS

| 5,025,412 | 6/1991 | Dalrymple et al. | 364/900 |
| 5,367,646 | 11/1994 | Pardillos et al. | 395/325 |
| 5,420,412 | 5/1995 | Kowalski | 235/492 |
| 5,440,755 | 8/1995 | Harwer et al. | 395/800 |
| 5,553,249 | 9/1996 | Datwyler et al. | 395/308 |
| 5,606,672 | 2/1997 | Wade | 395/308 |
| 5,630,094 | 5/1997 | Hayek et al. | 395/473 |
| 5,793,996 | 8/1998 | Childers et al. | 395/309 |

*Primary Examiner*—Ayaz R. Sheikh
*Assistant Examiner*—Xwong Chung-Trants
*Attorney, Agent, or Firm*—A.P. Tennent

[57] ABSTRACT

An apparatus and method for using a single, multi-purpose chip for translating a personal computer format or protocol (such as ISA, MCA, PCMCIA or PCI formats) to an output format such as the IBM 5250 format or TWINAX.

18 Claims, 2 Drawing Sheets

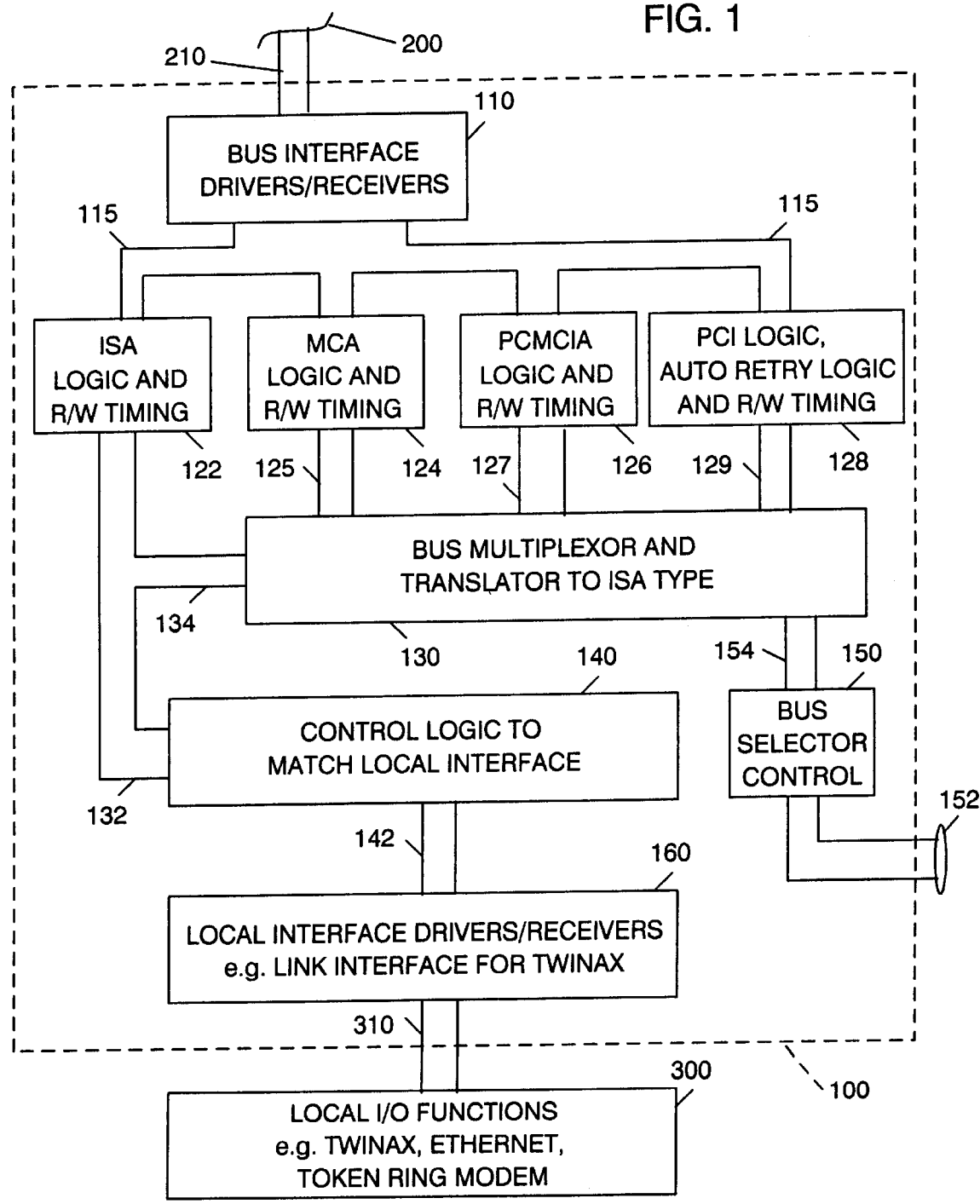

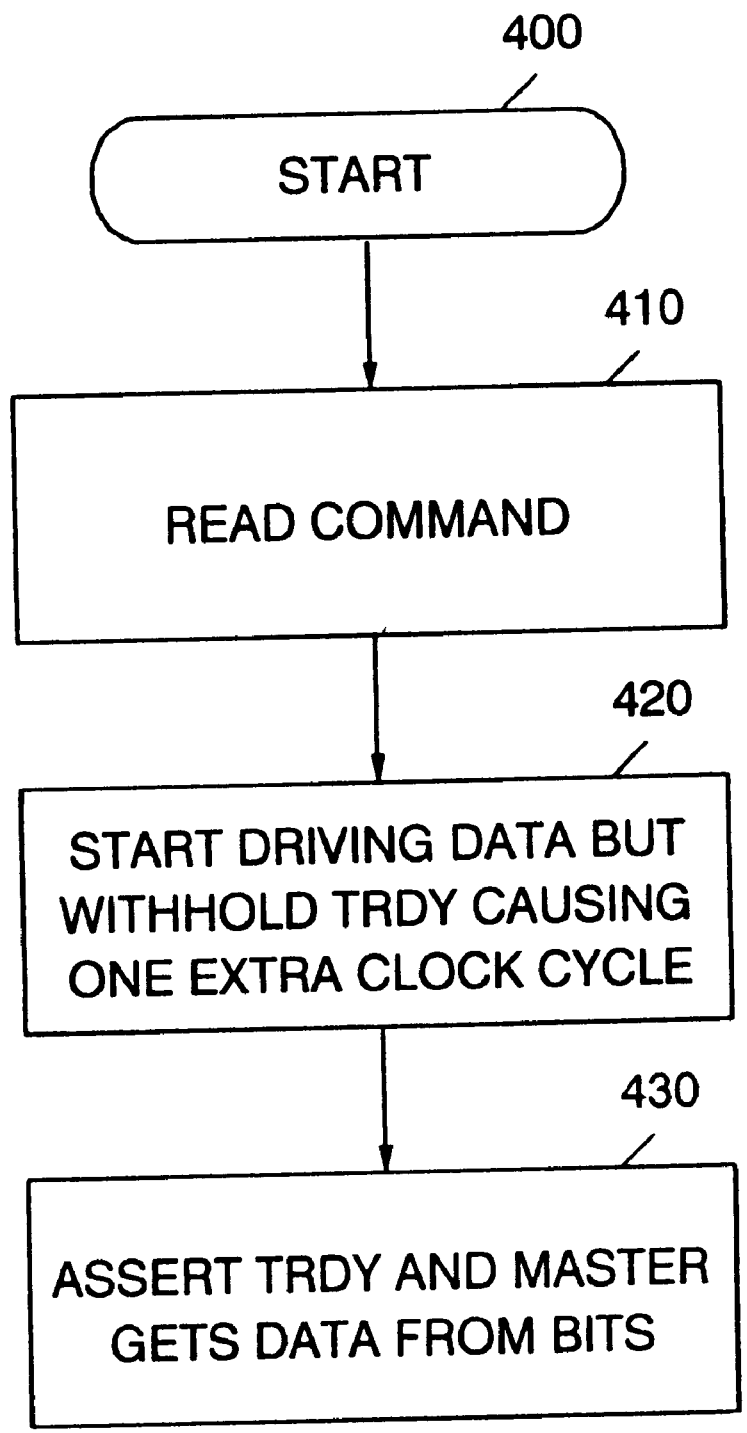

APPARATUS AND METHOD FOR COMMUNICATION AND TRANSLATION FOR SELECTED ONE OF A VARIETY OF DATA BUS FORMATS

BACKGROUND OF THE INVENTION

1. Field of the Invention

This invention pertains to the field of data processing. More specifically, the invention pertains to a method and system for providing an interface for converting between an external device and a selected one of a variety of data buses using a single common translation chip. That is, conversion between a single selected data bus protocol and an external device protocol is accomplished by the chip but the same chip can accomplish a conversion between the external device protocol and a different data bus protocol by a different translation selection.

2. Description of the Prior Art

In accordance with the present invention, a single chip with the capability of translating from any one of several data bus formats (ISA, PCI, MCA or PCMCIA) into a single external device protocol such as the IBM 5250 or TWINAX, with communications operating in both directions.

As used herein, ISA, PCI, MCA AND PCMCIA are interfaces which are industry defined and standard formats for communication to a personal computer.

U.S. Pat. No. 5,440,755 relates to a bus connector with translation from one format to another.

U.S. Pat. Nos. 5,025,412 and 5,367,646 deal with connecting one bus format with a system which converts to another format.

While the prior art, of which the above noted patents are examples, is generally useful for its limited intended purpose, it does not provide a single chip with the capability of translation from a selected one of the several formats that the chip can translate.

SUMMARY OF THE INVENTION

The method and apparatus of the present invention uses a selector to determine which translation format or protocol is desired between an external device (IBM 5250 TWINAX) and selected data bus protocol.

This invention finds utility in memory and adaptor cards used in personal computers.

The present invention allows the same chip to be used in a variety of different applications, that is, the same chip can be used with one selection.

This invention allows a single chip to be inventoried for diverse cards using diverse translations.

The present invention provides a means for selecting the translation protocol which is desired.

An object of the invention is to provide a single chip which can be used in any one of the several protocols.

A further object of the invention is to allow multiple cards for multiple protocols.

The present invention allows the chip to reuse a limited number of input/output pins, avoiding the necessity of having a separate set of pins for each protocol.

These and other objects and advantages of the invention will be apparent to those of skill in the art upon reference to the following detailed description of the invention, which description makes reference to the drawing.

BRIEF DESCRIPTION OF THE DRAWING

FIG. 1 shows a schematic of the chip of the present invention, with the capability for translation from a selected bus interface to a common core logic.

FIG. 2 shows a flow chart of the continuous data stepping function used in the PCI translation of FIG. 1.

DESCRIPTION OF THE PREFERRED EMBODIMENT

FIG. 1 illustrates schematically the components of a single converting chip 100 for interfacing to a selected one of a plurality of interfaces for converting signals between that interface (or protocol) and a desired fixed protocol. Also illustrated are external devices 200, 300 and buses 210, 310 respectively, which connect the external devices 200, 300 to the converting chip 100.

In its preferred embodiment, the external device 200 would be a personal computer or other processor which uses either the ISA (Industry Standard Architecture) protocol, the MCA (Micro Channel Architecture) protocol, PCMCIA (Personal Computer Memory Card Industry Association) protocol or the PCI (Peripheral Component Interface) protocol from Intel. The external device 300 would be an IBM 5250 driver/receiver coupled to TWINAX cable (also referred to as a TWINAX) but could be an Ethernet, token ring or modem interface, etc.

The single converting chip 100 serves to process information going both ways between the external devices 200, 300. That is, data can pass from the personal computer 200 to the external device 300 at one time and later pass from the external device 300 to the personal computer 200 at other times.

The single chip 100 includes bus interface drivers/receivers 110 coupled to the external device 200 at the bus 210. A bus 115 couples the bus interface drivers/receivers 110 to ISA Logic and Read/Write Timing function in block 122, MCA Logic and Read/Write Timing at block 124, PCMCIA Logic and Read/Write Timing at block 126 and PCI Logic, including continuous data stepping and Read/Write Timing at block 128. Blocks 124, 126 and 128 are connected by buses 125, 127, 129, respectively to Bus Multiplexor and Translator 130 which converts the respective protocols (MCA, PCMCIA and PCI, respectively) to ISA type protocol. The ISA protocol from block 122 passes on bus 132 to Control Logic 140 to match (or convert to) the local interface for the external device 300. Alternatively, the ISA type protocols as converted by block 130 are connected by buses 134 and 132 to the control logic 140.

The control logic 140 is connected by bus 142 to local interface drivers/receivers 160 and thence to the external device 300 by bus 310.

Bus selector control 150 serves to select the type of conversion which is desired through the use of selector lines 152. In the embodiment shown where up to four protocols are selectable, two selector lines can be used to make the protocol selection. If both lines are low or grounded, a first protocol may be indicated; if the first line is high and the second is low, the second protocol is selected; if the first line is low and the second line is high, the third protocol is selected and if both are high, the fourth protocol is selected. The bus selector control 150 is coupled by lines 154 to the bus multiplexor and translator 130 and, from there to the blocks 122, 124, 126 and 128 to select the desired protocol conversion.

The PCI Logic in block 128 serves a protocol which operates at a substantially higher speed (33 MHz) than the other protocols which operate at 10 MHz or less.

The Bus Interface 110 includes address, data, command and error reporting signals of the selected protocol.

FIG. 2 illustrates the flow chart of the logic implementing the continuous data stepping function of the PCI protocol specification. From start block 400, when a read command at block 410 is issued, the logic at block 420 begins driving data onto the bus but delays the TRDY signal out to the PCI bus by 1 clock to allow the data on the bus enough time to be at a valid state when TRDY is asserted at block 430.

While the invention has been described by making reference to preferred embodiments thereof, it is recognized that those skilled in the art will readily visualize yet other embodiments that are within the spirit and scope of the invention. Thus it is intended that the above detailed description not be taken as a limitation on the invention.

What is claimed is:

1. A protocol converter on a single chip for attaching a first device on a first bus operating in accordance with one of a plurality of protocols to a second device on a second bus operating in accordance with a different protocol comprising:
   a) a plurality of different logic circuits each operating in accordance with one or another of the plurality of protocols;
   b) a conversion circuit for converting from a first of the plurality of protocols to the different protocol;
   c) an adapter circuit for translating each of the other protocols of the plurality of protocols to the first of the plurality of protocols for conversion by the conversion circuit to the different protocol; and
   d) a selection circuit for setting the operation of the converter to the protocol in use by the first device.

2. The protocol converter of claim 1 wherein the adapter circuit couples one of said plurality of different logic circuits operating under the protocol in use by the first device through the conversion circuit to the second bus for translating signals of the protocol of the first device to the different protocol while leaving the remaining logic circuits of said plurality of different logic circuits operating under the other protocols of the plurality of protocols present but disengaged from the second bus.

3. The protocol converter of claim 2 wherein the first of the protocols is the ISA protocol and the other protocols of the plurality of protocols are the MCA, PCMCIA, and PCI protocols.

4. The protocol converter of claim 3 including a delay circuit delaying for one cycle the translation of PCI protocol signals to said one of the plurality of protocols.

5. The protocol converter of claim 1 wherein the selection circuit includes two lines wherein each of the logic circuits is engaged through the adapter circuit by one of four combinations of high and low signals on the two lines.

6. The logic of claim 1 wherein the logic, conversion and adapter circuits are bidirectional circuits for translating signals in both directions.

7. The protocol converter of claim 6 including bus interface drivers and receivers coupling the logic circuits to the first bus.

8. The protocol converter of claim 7 including bus interface drivers and receivers coupling the conversion circuit to the second bus.

9. The protocol converter of claim 8 wherein the protocol for the second bus is one of the TIWNAX, Ethernet and token ring protocols.

10. A protocol converter on a single chip for attaching a computer on a first bus operating in accordance with one of a plurality of protocols to a device on a second bus operating in accordance with a different protocol comprising:
    a) a plurality of different logic circuits each operating in accordance with one or another of the plurality of protocols;
    b) a conversion circuit selectively coupled to one of the plurality of different logic circuits operating under a first of the plurality of protocols for converting from said first of the plurality of protocols to the different protocol;
    c) an adapter circuit coupled to the remaining logic circuits of said plurality of different logic circuits for translating each of the other protocols in the plurality of protocols to said first of the plurality of protocols for conversion by the conversion circuit to the different protocol; and
    d) a selection circuit for setting the operation of the converter to translate the protocol in use by the computer by coupling to the conversion circuit the logic circuit operating in accordance with said protocol in use.

11. The protocol converter of claim 10 wherein the adapter circuit couples one of said plurality of different logic circuits operating under the protocol in use by the computer through the conversion circuit to the second bus for translating signals of the protocol of the computer to the different protocol while leaving the remaining logic circuits of said plurality of different logic circuits operating under the other protocols of the plurality of protocols present but disengaged from the second bus.

12. The protocol converter of claim 11 wherein the selection circuit includes two lines wherein each of the protocol circuits is engaged by one of four combinations of high and low signals on the two lines to select between one of four different protocols in the plurality of protocols.

13. The protocol converter of claim 12 wherein the first of the protocols is the ISA protocol and the other protocols of the plurality of protocols are the MCA, PCMCIA, and PCI protocols.

14. The logic of claim 13 wherein the logic, conversion and adapter circuits are bidirectional circuits for translating signals between the first and second buses in both directions.

15. The protocol converter of claim 14 including bus interface drivers and receivers coupling the logic circuits to the first bus.

16. The protocol converter of claim 15 including bus interface drivers and receivers coupling the conversion circuit to the second bus.

17. The protocol converter of claim 16 wherein the protocol for the second bus is one of the TIWNAX, Ethernet and token ring protocols.

18. The protocol converter of claim 13 including a delay circuit delaying for one cycle the translation of PCI protocol signals to the one of the other protocols.

* * * * *